United States Patent [19]
Pickering

[11] 3,897,083
[45] July 29, 1975

[54] SUPPORT LEG FOR A TRAILER BODY
[76] Inventor: Neil Pickering, 16 Lesbury Ave., Brampton, Canada
[22] Filed: Nov. 1, 1974
[21] Appl. No.: 519,937

[30] Foreign Application Priority Data
Mar. 13, 1974 Canada................................ 194903

[52] U.S. Cl............................ 280/150.5; 254/86 R
[51] Int. Cl.²........................................... B60S 9/02
[58] Field of Search........ 280/150.5, 475; 254/86 R, 254/86 H

[56] References Cited
UNITED STATES PATENTS
2,233,135  2/1941  Ketel................................ 254/86 R
2,785,761  3/1957  Becker................................ 180/8 C
3,197,235  7/1965  Chieger............................. 280/150.5
3,219,362  11/1965  Epstein............................. 280/150.5
3,666,290  5/1972  Dalton et al..................... 280/150.5
3,767,226  10/1973  Stephens.......................... 280/150.5

Primary Examiner—Leo Friaglia
Attorney, Agent, or Firm—Fetherstonhaugh & Co.

[57] ABSTRACT

This invention relates to a support leg construction for supporting a trailer body comprising a support leg, a shoe for said leg having longitudinally extending track means therein, a foot on said support leg, said foot engaging in said track means and being adapted to slide therein as the forward end of a trailer supported by said leg in use moves forwardly.

5 Claims, 5 Drawing Figures

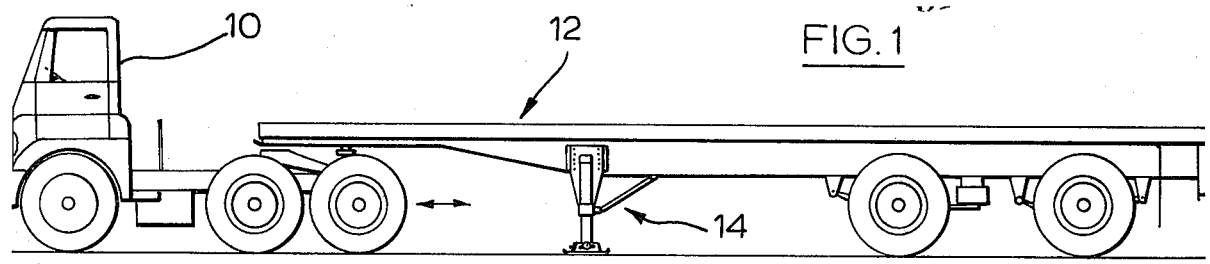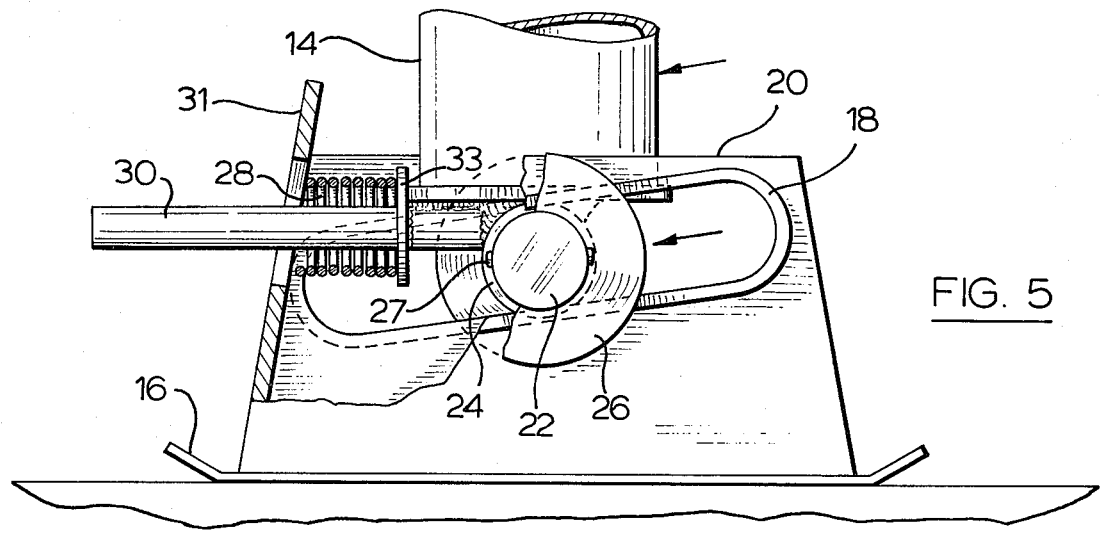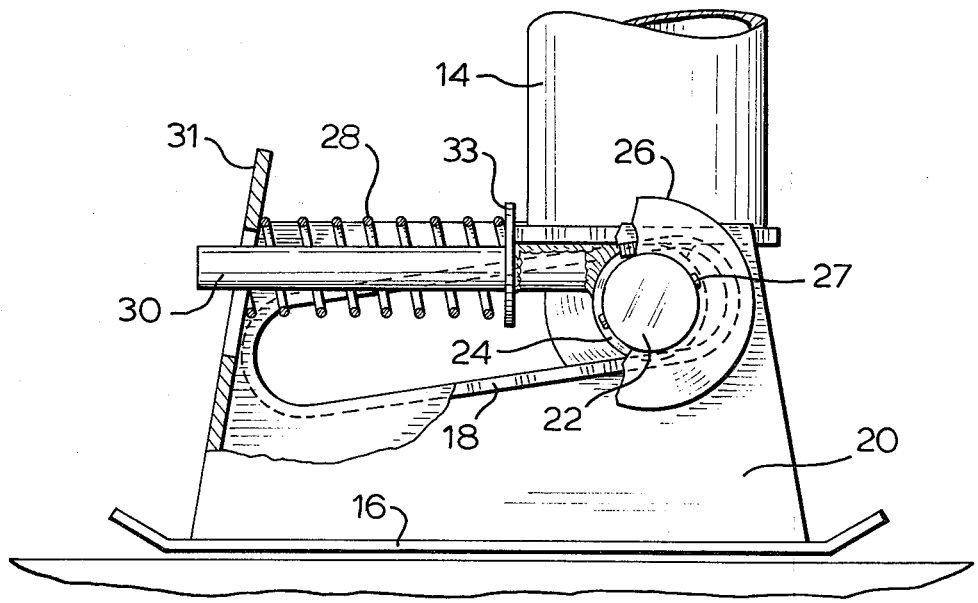

PATENTED JUL 29 1975    SHEET 2    3,897,083

SUPPORT LEG FOR A TRAILER BODY

This invention relates to a support leg for the forward end of a trailer vehicle and to a base member for mounting at the free end of such a support leg.

Highway trailers that are connected to truck vehicles by means of a fifth wheel or other connection are in common use. It is quite usual in practice to park the trailer, often in a loaded condition, apart from the truck. In these cases, the trailer has retractable support legs at its forward end to maintain the forward end of the trailer in an elevated position when the truck is disconnected from the trailer.

Many trailers have a pneumatic wheel suspension which tend to sag when the trailer is parked unless the air is released therefrom at the time of parking. With the sagging, there is a forward motion of the trailer body. If the trailer body is mounted on support legs at its forward end, such a forward motion can bend the legs, which are rigid at their point of contact with the ground. It is not an uncommon occurrence to have the support legs break from such bending and permit the front end of the trailer to drop. The picking up of such a trailer loaded with a load is a time consuming and costly procedure.

It is an object of this invention to provide a support leg structure which will permit relative movement of the support leg with respect to the ground in a forward direction in the event that the trailer body should tend to move in a forward direction under parked conditions.

With this object in view, the invention generally comprises a shoe for a support leg having a track therein which is designed to accept a foot on the lower end of the support leg for movement along the track. The movement along the track accommodates the forward shifting of the trailer body and permits the leg to move forwardly with respect to the ground.

The invention will be clearly understood after reference to the detailed specification read in conjunction with the drawings.

IN THE DRAWINGS:

FIG. 1 is a side illustration of a tractor trailer of the type with which this invention is concerned;

FIG. 4 is a side illustration of the structure shown in FIG. 3; and

FIG. 5 is a similar illustration to FIG. 4 but showing the leg in a more forward position in the track.

Figure 2:
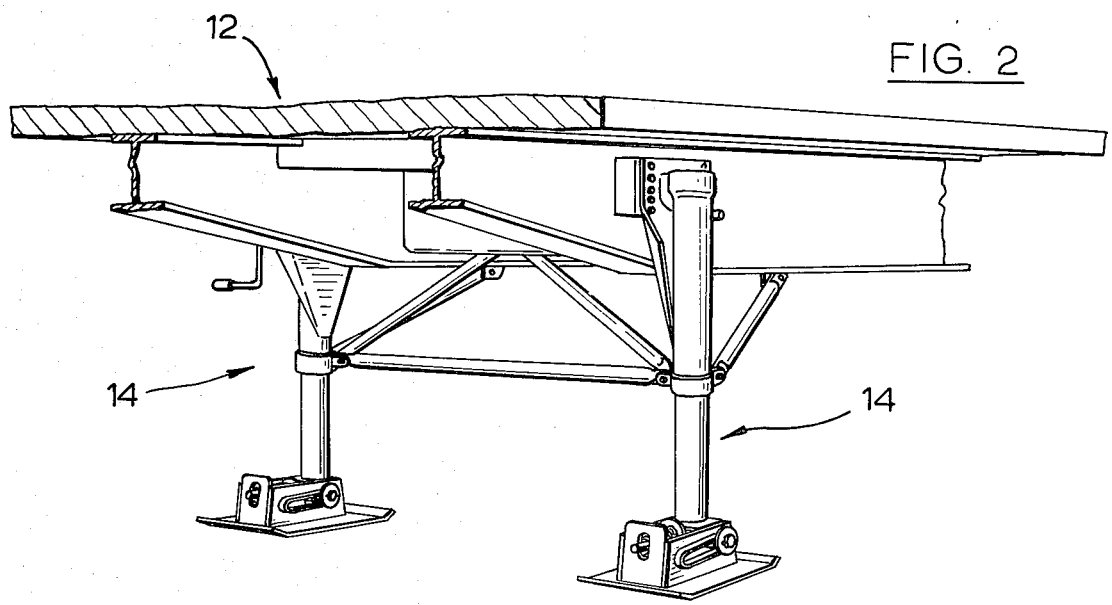
FIG. 2 is a perspective illustration of a support leg structure for the front end of a trailer in accordance with this invention.

Referring to the drawings, the numeral 10 refers to a tractor truck which has a trailer, generally indicated by the numeral 12, connected thereto. The truck is at rest and it is desired to remove the truck 10 from the trailer 12. In order to do this, retractable legs 14 on the underside of the trailer 12 are operated from a retracted position to the extended position illustrated in FIGS. 1 and 2. The general design of the retractable legs 14 is well known and not described in detail in this specification. This invention is concerned with the support leg structure at the bottom where it engages with the ground. As indicated in the preamble, when the support legs 14 are operated into position, the truck 10 is disconnected from the trailer 12 and driven away to leave the trailer in a free standing position with its forward end supported by the legs 14.

The invention is concerned with the design of the support leg structure at its lower end, and in the embodiment shown, the support legs 14 are provided with a shoe 16 that engages with the ground. Shoe 16 has thereon opposed tracks 18 formed in opposed wall members 20. Tracks 18 are each designed to receive a free end of a foot bar 22 which is rotatably mounted in the sleeve 24 that is in turn welded to the lower end of the leg 14. Discs 26 held on the free ends of the bar 22 by pins 27 locate and maintain the foot 22 on the track 18.

Figure 3:
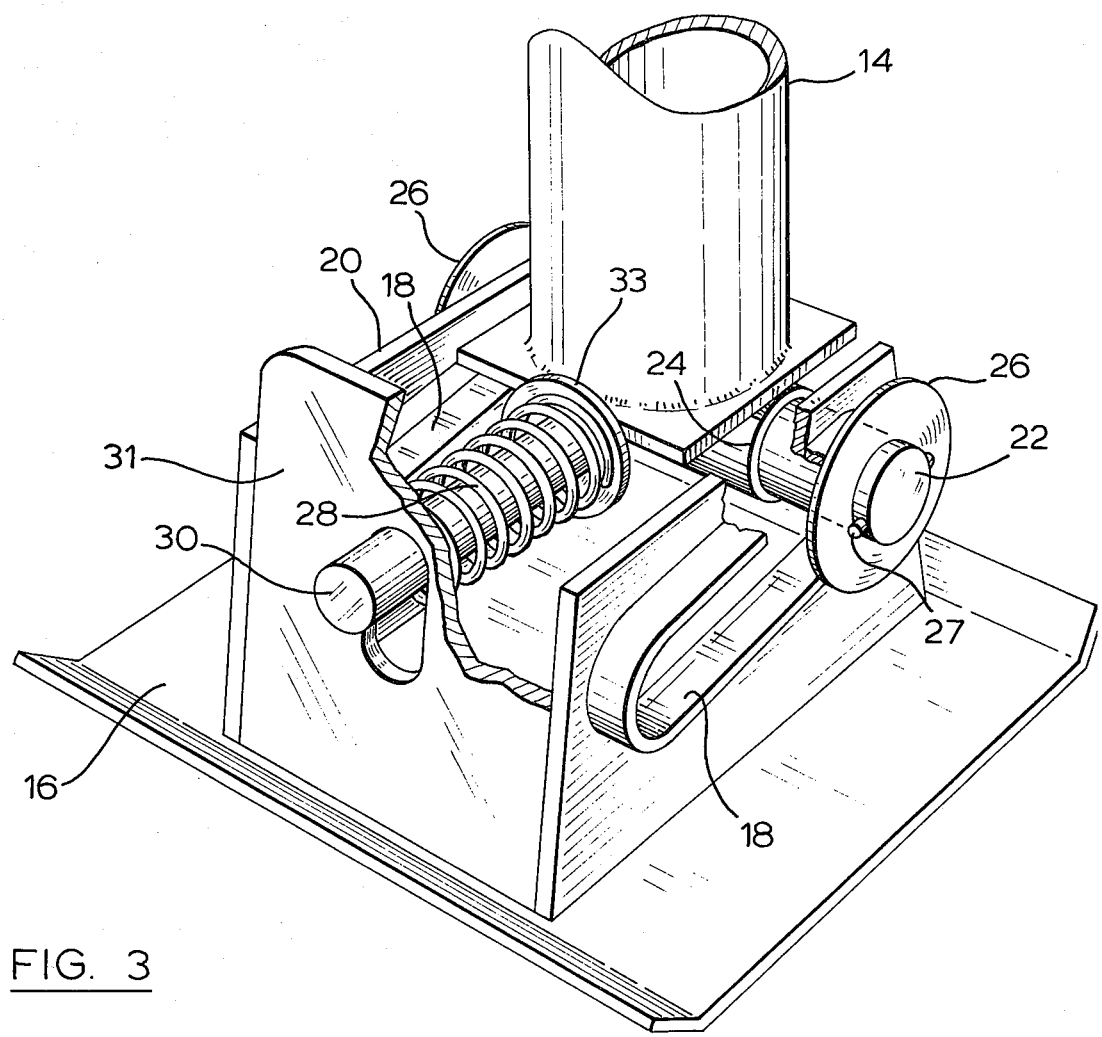
FIG. 3 is an enlarged perspective view of the base and lower portion of a support leg.

A compression spring 28 on post 30 is compressed between the front plate 31 of the base and bearing plate 33 of the leg and its shoe to normally urge the shoe 16 and leg apart as shown in FIG. 3, and locate the foot 22 at the rear end of the tracks 18. Thus, when the legs 14 are lowered from their retracted position to the ground, the base structures thereof are in the position illustrated in FIG. 3 under the influence of springs 28.

In use, the legs 14 move forwardly with the trailer body if the trailer body moves forward under parked conditions and the foot bar rotates and moves forwardly in the tracks 18. The springs 28 are strong enough to maintain the shoe at the top of the tracks when the legs are retracted, but not strong enough to interfere with forward movement of the foot bar 22 in the tracks as the trailer body moves forward. Thus, as the trailer body moves forward, the feet or foot bar of legs 14 move forward in the tracks 18. This movement avoids the bending of the legs 14 that would otherwise occur if the free ends of the legs 14 was rigid with respect to the ground.

In the embodiment of the invention illustrated, the foot bar 22 is made of steel rod having a diameter of one and seven-eighths inches, and a length of about twelve inches. Washers 26 have an outside diameter of about two inches. Tracks 18 of shoe 16 are one-quarter inch think steel, one and one-quarter inches wide and about ten inches long. The shoe is also made from one-quarter inch steel plate material. These are all capable of variation and indeed the design of the device illustrated is capable of variation. The essential thing is a shoe that has a forwardly extending track adapted to receive a foot on the lower end of a trailer support leg and within which the foot can move. Movement is encouraged by the slope of the tracks. In the embodiment illustrated, the tracks drop about one inch from back to rear. This is a matter of design, the important consideration being that the foot engages the track of the shoe for forward movement as the trailer body moves forward. The bearing illustrated has proven satisfactory, but roller or other bearings may be used without departing from the spirit of the invention and if they were, the forward movement would obviously be achieved with a smaller slope.

The embodiments of the invention in which an exclusive property or privilege is claimed are defined as follows:

1. A support leg construction for supporting a trailer body comprising
   a support leg,
   a shoe for said leg having longitudinally extending track means therein,
   a foot on said support leg, said foot engaging in said track means for forward movement therein as the forward end of the trailer supported by said leg in use moves forwardly, means for normally urging said foot towards the rearward end of said track means, said track means sloping downwardly from back to front of said shoe.

2. A shoe for a support leg for a trailer body comprising a foot engageable with said shoe, said shoe having longitudinally extending track means therein, said foot being adapted to slide along said track means, means for normally urging said foot towards the rearward end of said track means, said track means sloping from back to front of said shoe.

3. A support leg construction for supporting a trailer body as claimed in claim 1 in which said foot is rotatably mounted on said leg.

4. A support leg construction for supporting a trailer body as claimed in claim 1 in which said foot comprises a bar rotatably mounted on said leg.

5. A shoe for a support leg for a trailer body as claimed in claim 2 in which said foot is rotatably mounted on said leg.

* * * * *